INVENTORS.
Robert R. Crookston,
James S. Waters,
BY
AGENT.

Sept. 8, 1953     R. R. CROOKSTON ET AL     2,651,197
TORQUE INDICATING AND SHOCK ABSORBER DEVICE
Filed Dec. 16, 1950     6 Sheets-Sheet 4

INVENTORS.
Robert R. Crookston,
BY   James S. Waters,

AGENT.

Sept. 8, 1953 R. R. CROOKSTON ET AL 2,651,197
TORQUE INDICATING AND SHOCK ABSORBER DEVICE
Filed Dec. 16, 1950 6 Sheets-Sheet 5

INVENTORS.
Robert R. Crookston,
BY James S. Waters,

AGENT.

Sept. 8, 1953  R. R. CROOKSTON ET AL  2,651,197
TORQUE INDICATING AND SHOCK ABSORBER DEVICE
Filed Dec. 16, 1950

INVENTORS.
Robert R. Crookston,
BY James S. Waters,

AGENT.

Patented Sept. 8, 1953

2,651,197

UNITED STATES PATENT OFFICE 2,651,197

TORQUE INDICATING AND SHOCK ABSORBER DEVICE

Robert R. Crookston and James S. Waters, Houston, Tex., assignors, by mesne assignments, to Standard Oil Development Company, Elizabeth, N. J., a corporation of Delaware Application December 16, 1950, Serial No. 201,212

6 Claims. (Cl. 73—136)

The present invention is directed to apparatus for indicating torque on a rotary drilling machine. More particularly, the apparatus is directed to a device for measuring torque transmitted through a rotary drilling machine to the drill pipe which apparatus has incorporated therein means for absorbing shocks transmitted from the rotary drilling equipment and to the drive shaft thereof.

The present invention may be described briefly as a torque indicating and shock absorbing device which is adapted to embrace a driven shaft. The apparatus comprises an outer housing which defines with an outer surface thereof vertically spaced scale markings and has at least one window therein. An inner housing is disposed concentrically in the outer housing and defines therewith an annular space. The inner housing is adapted to receive an engaging means for the driven shaft. Arranged on the outer housing in the annulus is at least one radial inwardly extending member and arranged on the inner housing in the annulus is at least one outwardly extending member which is horizontally removed from the inwardly extending member. The inwardly extending and outwardly extending members define a confined space in which is arranged a deformable bag member. The deformable bag member is arranged between the inwardly and outwardly extending members and is fluidly connected to an indicating means. The indicating means has an indicator arranged in the window and is adapted to display a value on the scale markings on the exterior surface of the outer housing on transmission of rotary motion to the driven shaft and compression of said bag member by arcuate movement of said inner housing relative to the outer housing.

The apparatus of the present invention is designed to indicate torque applied either in a clockwise or counterclockwise direction. By providing at least two deformable bag members, each of which is arranged between an outwardly and an inwardly extending member and connecting the two bag members to the indicating means through a double check valve or other valve means which will perform similarly, torque transmitted through the inner housing may be indicated on the indicating means.

The inner housing is arranged in the outer housing for limited arcuate movement therein relative to the outer housing. The arcuate movement is limited by the distance between an inwardly extending member and an outwardly extending member between which the deformable bag member is arranged. As the inner housing moves arcuately the force applied thereto results in compression of the deformable bag member containing a hydraulic fluid which transmits the force applied to the deformable bag member through a conduit connecting it to an indicating means which results in the display of a value which is equal to the torque applied to the deformable bag member.

The invention will be described in further detail by reference to the drawing in which Fig. 1 is a top view of the device of the present invention incorporated in a Kelly drive bushing housing;

In the several views of the drawing identical numerals will be employed to designate identical parts.

Figure 1:
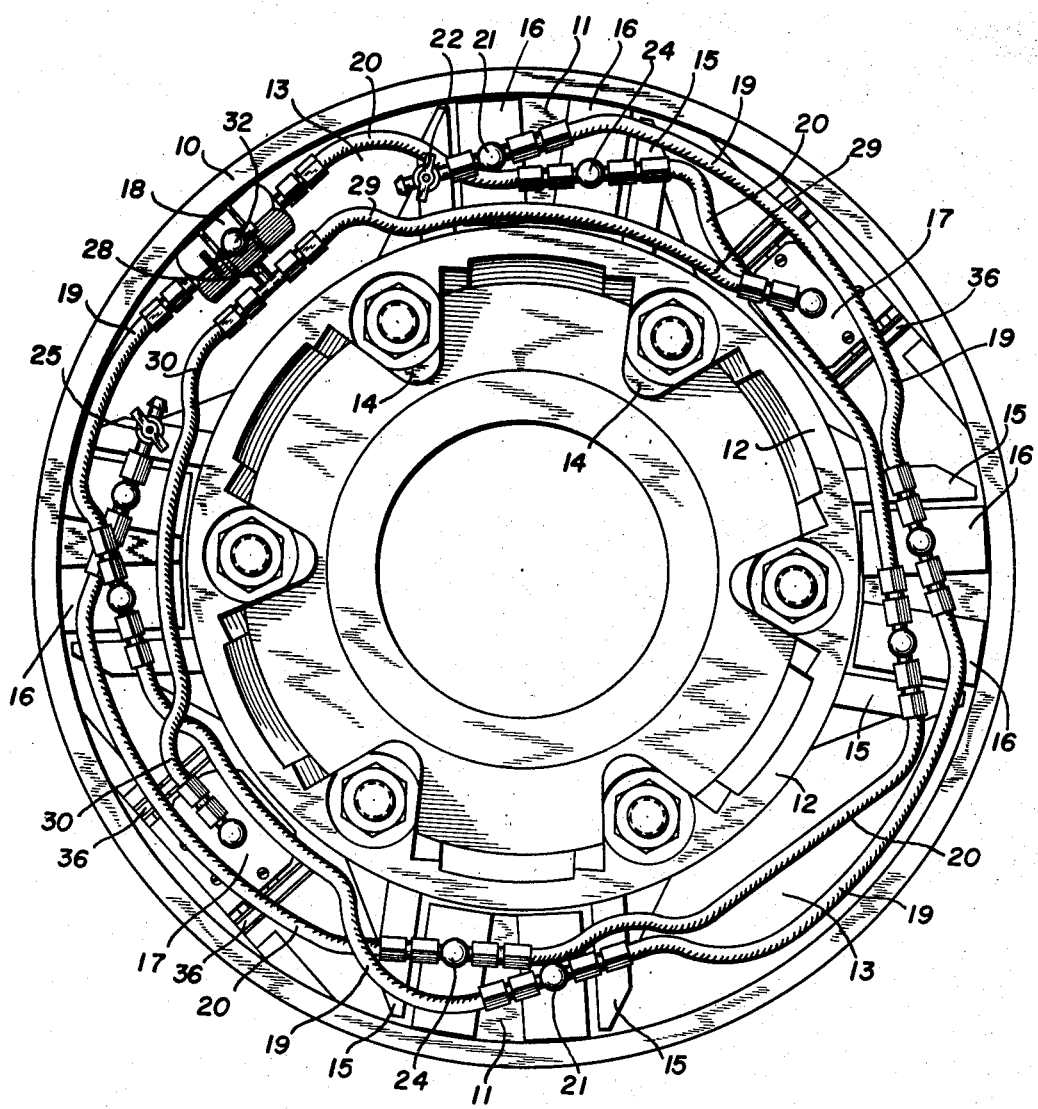

Referring now to the drawing, numeral 10 designates an outer housing having radially inwardly projecting members 11. An inner housing 12 defines with the outer housing 10 an annular space 13. The inner housing 12 is provided with lugs 14 to accommodate roller inserts which are adapted to be engaged with the polygonal faces of a vertically positioned Kelly bar, not shown.

The inner housing 12 defines on its outer surface pairs of equally spaced outwardly extending members 15. The outwardly extending members 15 are horizontally spaced from the inwardly extending members 11. Disposed between the outwardly extending members 15 and the inwardly extending members 11 are hydraulic rubber bags 16 which are adapted to receive a hydraulic fluid. The hydraulic rubber bags 16 may suitably be constructed of a deformable material which is resistant to hydraulic fluid. For example, selected synthetic rubbers have been used to resist attack by hydraulic fluids, such as hydrocarbon oils. Arranged in the annular space 13 are two indicating means or gauge devices 17 which will be described in further detail. One of the indicating means may be a low torque indicating gauge and the other indicating means may be a high torque indicating gauge. The annular space 13 is also provided with double check valve 18 which is employed to distribute hydraulic fluid to the deformable bags 16 in a manner to be described further.

The hydraulic bags 16 are interconnected by conduits 19 and 20. The conduit 19 serves to connect a series of deformable bags 16 for indicating torque on clockwise motion whereas the conduit 20 interconnects a series of bags for indicating torque on counterclockwise motion.

Figure 3:
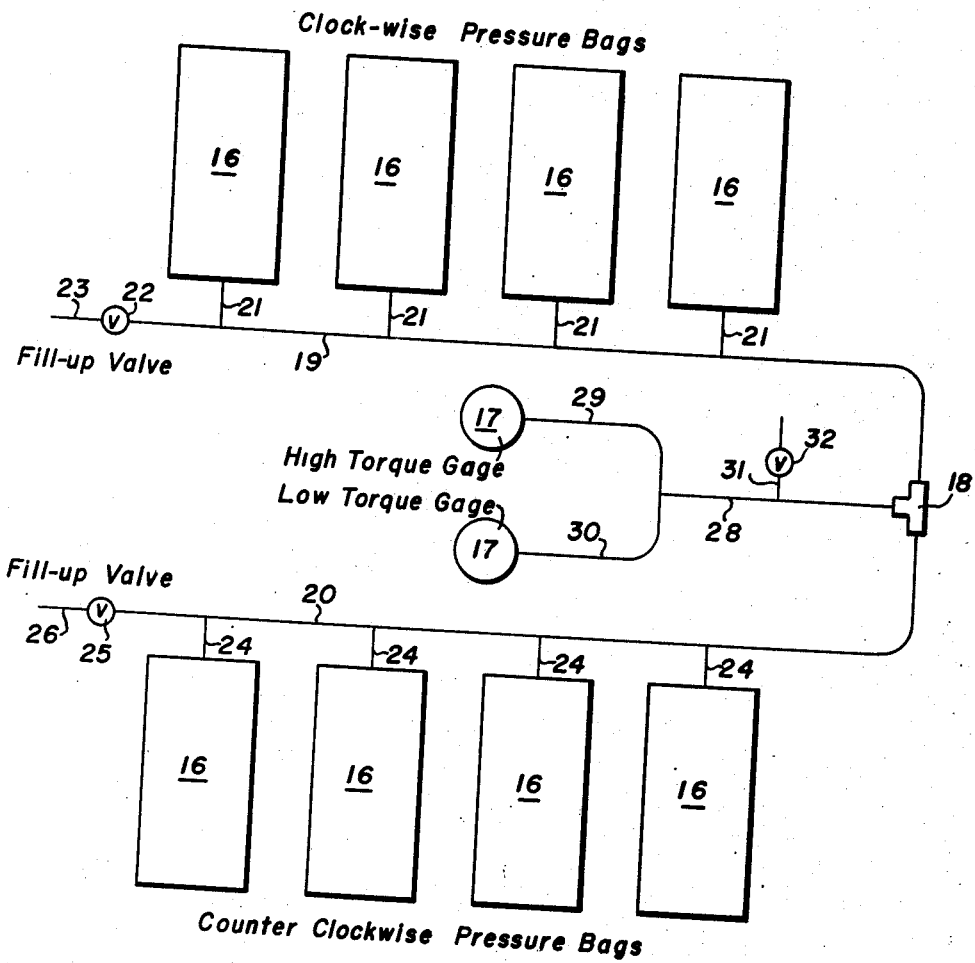
Fig. 3 is a flow diagram showing the movement of the hydraulic fluid from the deformable bag members to the indicating means.
Figure 5:
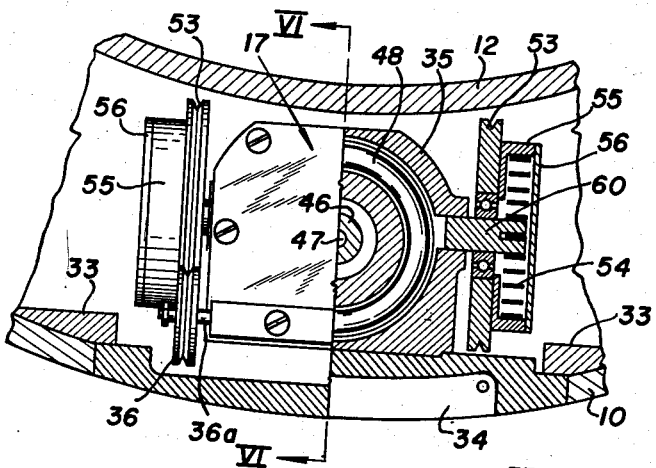
Fig. 5 is a view taken along line V—V of Fig. 4.
Figure 4:
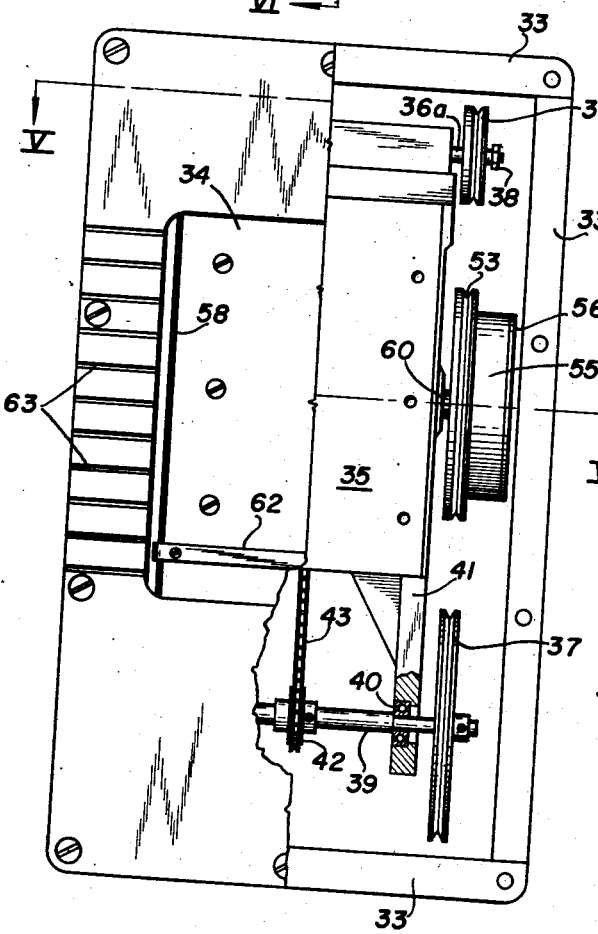
Fig. 4 is an elevational view in partial section of the indicating means.
Figure 6:
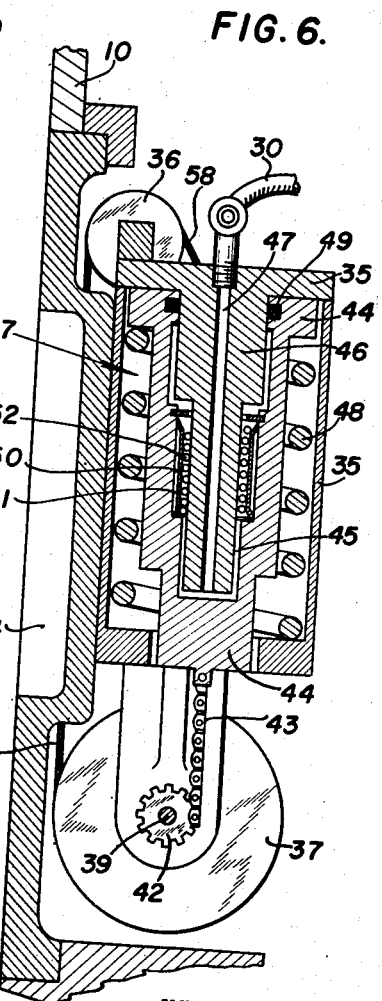
Fig. 6 is a view taken along line VI—VI of Fig. 5.
Figure 7:
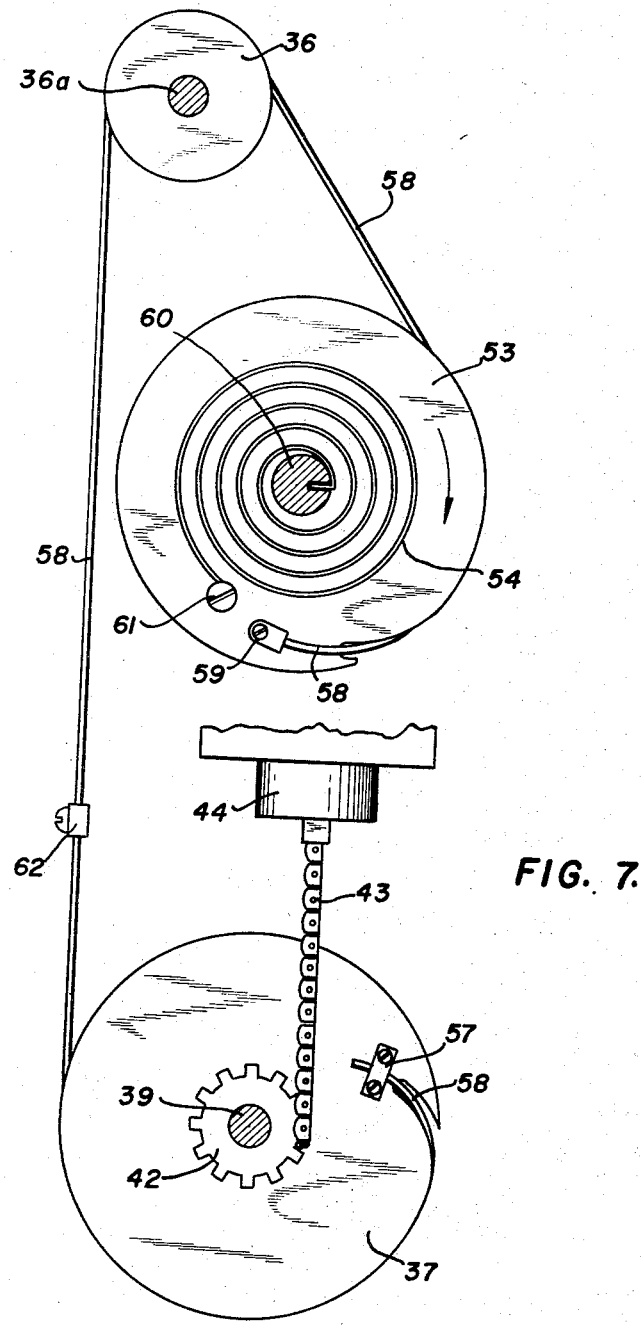
Fig. 7 is an elevational view with parts cut away of Fig. 6 to show arrangement of the elements with respect to each other.

Referring now to Fig. 3, a first set of hydraulic bags 16 are connected to conduit 19 by branch lines 21. Conduit 19 is provided with a filling valve 22 which connects to a source, not shown, of hydraulic fluid by line 23. A second set of hydraulic bags 16 are connected to line 20 by branch line 24. Conduit 20, like conduit 19, is provided with a filling valve 25 which may be connected by line 26 to a source of hydraulic fluid, not shown. Conduits 19 and 20 are interconnected by a double check valve 18 which allows the hydraulic fluid to be transmitted from either of the set of bags 16 to the high torque gauge 17 or to the low torque gauge 17, as may be desired, through line 28 which connects to branches 29 and 30. Line 28 is provided with a bleed line 31 containing a valve 32 to bleed off hydraulic fluid when desired. The indicating means employed in the practice of the present invention is described in more detail in Figs. 4 to 7, inclusive.

Figure 2:
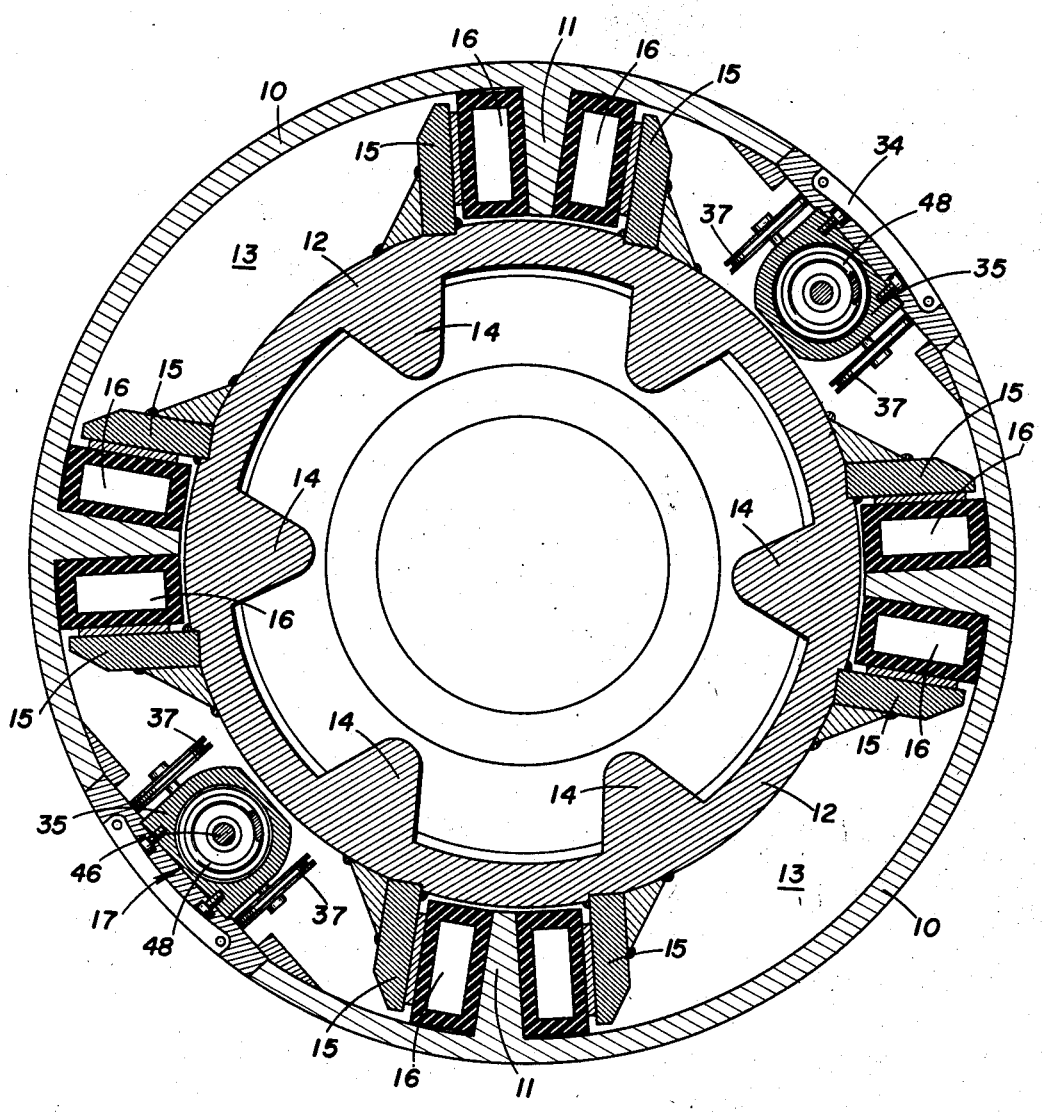
Fig. 2 is a sectional view of Fig. 1 showing the bag members.

Referring now to Figs. 4 to 7, numeral 33 represents a frame member for the indicating means generally designated as 17. This indicating means is arranged adjacent to a window 34 in the housing 10 as shown more clearly in Figs. 1, 2, and 8. The indicating means 17 is provided with a housing 35 which is arranged in the annular space 13 and is attached to the outer housing 10. The gauging means is provided with a first pair of pulleys 36 and a second pair of pulleys 37. Pulleys 36 are carried by a shaft 36a attached to the housing 35 and are firmly affixed thereto by nuts 38. Pulleys 37 are carried by a shaft 39 arranged in a bearing 40 carried by an extension member 41 of the housing 35. Shaft 39 is provided with a sprocket wheel 42 which is attached to a chain 43 which, in turn, is attached to a piston member 44. The housing 35 is provided with an internal piston cylinder 45 surrounding a stationary guide member 46 which defines a central passageway 47 which connects to either the conduit 19 or 20. The piston 44 is embraced by a compression means 48 which urges the piston 44 in an upward direction in the housing 35. The guiding or stationary member 46 and the piston member 44 are provided with a sealing means, such as an O-ring 49. A guide bushing sleeve 50 is arranged in a space 51 defined by the piston 44 and the member 46 and embraces re-circulating balls arranged therein. Sleeve 50 serves as a ground bearing race and return passage for the balls.

The indicating means 17 is provided with a third pair of pulleys 53 which carry a spring 54 which is encased in a housing 55 provided with a cover plate 56. Attached to pulleys 37 by a clamp 57 are cables 58 which pass over pulleys 36 and are attached to pulleys 53 by screw 59. Pulleys 53 are arranged on a shaft 60 carried by the housing 35. The springs 54 are attached to the pulleys 53 by a suitable connection means such as a screw 61. Arranged on the cable 58 of which there are two in number is an indicator bar 62 which is displayed in the window 34 of the outer housing 10.

Figure 8:
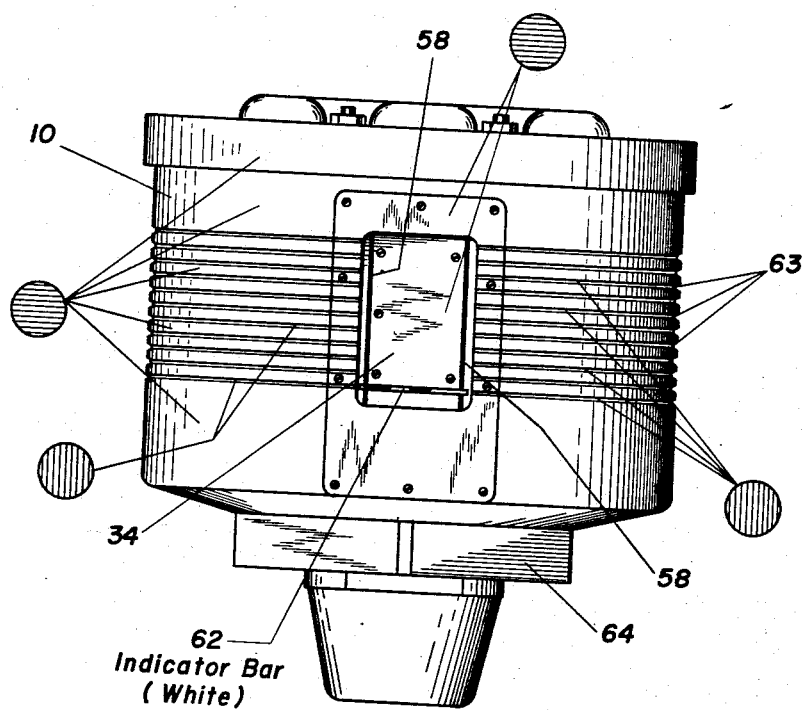
Fig. 8 is an elevational view of the apparatus of the present invention showing the scale markings and the relationship of the outer housing 10 to the Kelly bushing.

This indicator bar is in juxtaposition with vertically spaced markings 63 on the outer housing 10 as shown more clearly in Fig. 8.

The device of the present invention operates as follows:

As rotary motion is transmitted to the outer housing 10 by the Kelly bushing drive 64 the outer housing 10 and the inner housing 12 are caused to rotate in turn imparting rotary motion to the Kelly bar, not shown, embraced by the inner housing 12. Any force which tends to restrict easy rotation of the Kelly drive, such as diamond coring in hard formations, backing off of safety joints or fishing or milling operations, causes limited arcuate movement of the inner housing 12 limited by the inwardly extending members 11 and the outwardly extending members 15. As a result of the limited arcuate movement of the inner housing 12 the bags 16 which are filled with a hydraulic fluid are compressed forcing hydraulic fluid into either conduits 19 or 20 and thence into passageway 47 of the indicating means 17. The hydraulic fluid causes the piston 44 to move downward which causes rotation of the sprocket wheel 42 through chain 43 which, in turn, causes rotation of the pulley 37 and the pulley 36 by cable 58, tension being maintained on the cable 58 by spring 54 which causes the cable 58 carrying the indicator 62 to move upward allowing torque to be indicated on the scale markings 63.

The entire assembly 10 including the inner housing 12 is rotated rapidly. By coloring the outer surface of housing 10 blue, for example, and having the calibration markings 63 in a contrasting color, such as red, and the indicator bar a still further color, such as white, it is possible to observe, by virtue of the three colors and the contrast thereof, the torque being exerted on the drive mechanism. In short, the calibration scale markings 63 in combination with the blue background and the indicator bar 62 allows a stroboscopic effect to permit visual observations of the torque at rotational speeds of several hundred revolutions per minute of the outer housing 10.

The scale markings 63 may be arranged to read from 1000 to 10,000 foot-pounds or from 10,000 to 100,000 foot-pounds. In short, the scale markings may indicate any desired range of torque.

In the embodiment of the present invention the deformable bags have been shown as rectangular in shape. It is, of course, within the spirit and scope of our invention to construct the bags of different shapes and dimensions. For example, they may be constructed of cylindrical shape or in the shape of a pancake which may contain hydraulic fluid.

In the foregoing description taken with the several figures of the drawing, it will be apparent that, while the apparatus of the present invention functions as a torque indicator, it also serves as a means for absorbing shocks.

The apparatus may be constructed to allow varying the strength of the compression means to obtain an indicator bar 62 displacement of several inches with minimum hydraulic stroke displacement in the deformable bags 16. The device functions satisfactorily with a 5 to 1 multiplier but this may be adjusted by suitably choosing compression means 48 of different strengths.

While a suitable indicating device 17 has been described with respect to Figs. 4 to 7, inclusive, it is to be understood that any indicating means responsive to hydraulic pressure may be used whereby an indicator is displayed in the window 34.

This application contains subject matter common to an application Serial No. 201,223 filed December 16, 1950, for A. S. Badger and entitled "Pressure Indicating Device."

The nature and objects of the present invention having been completely described and illustrated, what we wish to claim as new and useful and to secure by Letters Patent is:

1. A torque indicating and shock absorbing device adapted to embrace a driven shaft having a vertically positioned axis which comprises, in combination, an outer housing defining with an outer surface thereof spaced scale markings extending generally circumferentially and axially spaced from one another, said outer housing having at least one window therein, an inner housing concentrically arranged in said outer housing defining an annular space with said outer housing and adapted to receive engaging means for said driven shaft, at least one radial inwardly extending member arranged on said outer housing in said annular space, at least one outwardly extending member arranged on said inner housing in said annular space horizontally removed from said inwardly extending member, at least one deformable bag member adapted to contain a hydraulic fluid arranged between said inwardly and outwardly extending members, and an indicating means fluidly connected to said bag member having an indicator arranged in said window in juxtaposition with said scale markings and adapted to display a value on said scale markings on transmission of rotary motion to said driven shaft and compression of said bag member by arcuate movement of said inner housing relative to said outer housing.

2. A torque indicating and shock absorbing device adapted to embrace a driven shaft having a vertically positioned axis which comprises, in combination, an outer housing defining with an outer surface thereof vertically spaced scale markings extending generally circumferentially and axially spaced from one another, said outer housing having at least one window therein, an inner housing concentrically arranged in said outer housing defining an annular space with said outer housing and adapted to receive engaging means for said driven shaft, a plurality of radially spaced inwardly extending members arranged on said outer housing in said annular space, a plurality of spaced outwardly extending members arranged on said inner housing in said annular space horizontally removed from said inwardly extending members, a plurality of fluidly connected deformable bag members adapted to contain a hydraulic fluid arranged between said inwardly and outwardly extending members, said inner housing being arranged in said outer housing for arcuate movement relative to said outer housing limited by said inwardly and outwardly extending members and an indicating means fluidly connected to said bag members having an indicator arranged in said window in juxtaposition with said scale markings and adapted to display a value on said scale markings on transmission of rotary motion to said driven shaft and compression of said bag housing relative to said outer housing.

3. A torque indicating and shock absorbing device adapted to embrace a driven shaft having a vertically positioned axis which comprises, in combination, an outer housing defining with an outer surface thereof vertically spaced scale markings extending generally circumferentially and axially spaced from one another and having at least one window therein, an inner housing concentrically arranged in said outer housing defining an annular space with said outer housing and adapted to receive engaging means for said driven shaft, at least one radial inwardly extending member arranged on said outer housing in said annular space, at least one outwardly extending member arranged on said inner housing in said annular space horizontally removed from said inwardly extending member, at least one deformable bag member adapted to contain a hydraulic fluid arranged between said inwardly and outwardly extending members and a gauging means in said annular space fluidly connected to said bag member having an indicator arranged in said window in juxtaposition with said scale markings adapted to display a value thereon on transmission of rotary motion to said driven shaft and compression of said bag member by arcuate movement of said inner housing relative to said outer housing.

4. A torque indicating and shock absorbing device adapted to embrace a driven shaft having a vertically positioned axis which comprises, in combination, an outer housing defining with an outer surface thereof vertically spaced scale markings extending generally circumferentially and axially spaced from one another and having at least one window therein, an inner housing concentrically arranged in said outer housing defining an annular space with said outer housing and adapted to receive engaging means for said driven shaft, a plurality of radially spaced inwardly extending members arranged on said outer housing in said annular space, a plurality of spaced outwardly extending members arranged on said inner housing in said annular space horizontally removed from said inwardly extending members, a plurality of fluidly connected deformable bag members adapted to contain a hydraulic fluid arranged between said inwardly and outwardly extending members, a hydraulic gauging means fluidly connected to said bag members arranged in said annular space having an indicator displayed in said window in juxtaposition with said scale markings adapted to display a value thereon on transmission of rotary motion to said driven shaft and compression of said bag member by arcuate movement of said inner housing relative to said outer housing.

5. A device in accordance with claim 4 in which the scale markings and the indicator are in contrasting colors and the outer surface of the outer housing has a color different from that of the scale markings and the indicator.

6. A torque indicating and shock absorbing device adapted to embrace a driven shaft having a vertically positioned axis for transmission of torque in a clockwise and counterclockwise direction which comprises, in combination, an outer housing defining with an outer surface thereof vertically spaced scale markings extending generally circumferentially and axially spaced from one another and having at least one window therein, said outer surface and said scale markings being in different colors, an inner housing concentrically arranged in said outer housing for limited arcuate movement relative to said outer housing defining an annular space with said outer housing, at least first and second radially spaced inwardly extending members arranged to said outer housing in said annular space, at least first and second outwardly extending members arranged on said inner housing horizontally removed from said first and second inwardly extending members, at least first and second deformable bag members adapted to contain a hydraulic fluid arranged between the first and second outwardly and inwardly extending members, a hydraulic gauging means in said annular space fluidly connected to said first and second bag members by means of a conduit defining a passageway for transmission of a hydraulic fluid from said bag members to said gauging means and vice versa, said conduit being provided with a valve means for restricting flow of hydraulic fluid to the gauging means from the first bag member on application of torque in a clockwise direction and for restricting flow of hydraulic fluid to the gauging means from the second bag member on application of torque in a counterclockwise direction and an indicator connected and responsive to said gauging means arranged in said window in juxtaposition with said scale markings having a color contrasting therewith and different from that of the scale markings and the outer surface adapted to display a visible value thereon on transmission of rotary motion to said driven shaft and compression of one of said bag members by arcuate movement of said inner housing relative to said outer housing limited by said inwardly and outwardly extending members.

ROBERT R. CROOKSTON.
JAMES S. WATERS.

References Cited in the file of this patent

UNITED STATES PATENTS

| Number | Name | Date |
|---|---|---|
| 195,837 | Nagle | Oct. 2, 1877 |
| 670,324 | Leverkaus | Mar. 19, 1901 |
| 2,300,288 | Hullhorst | Oct. 27, 1942 |
| 2,322,182 | Walker | June 15, 1943 |
| 2,593,000 | Bayless | Apr. 15, 1952 |